Dec. 25, 1923.

W. B. NICHOLS

SECTIONAL DEHYDRATOR

Filed Aug. 4, 1922

Section line 2-2, Fig.1.

INVENTOR:
William B. Nichols.
BY
Wiederscheim & Fairbanks
ATTORNEYS.

Dec. 25, 1923.
W. B. NICHOLS
SECTIONAL DEHYDRATOR
Filed Aug. 4, 1922
1,478,879
2 Sheets-Sheet 2
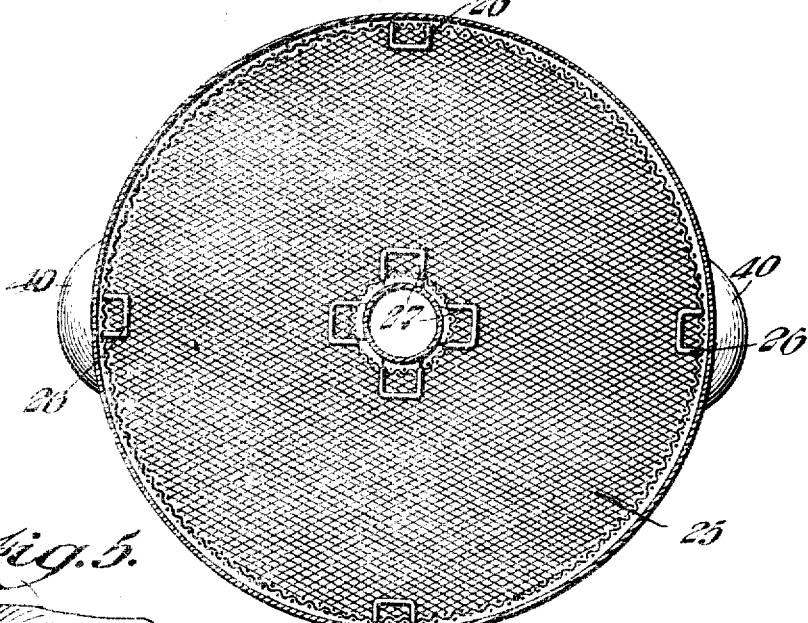
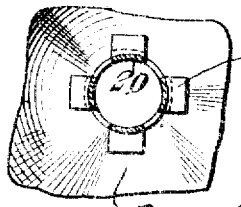
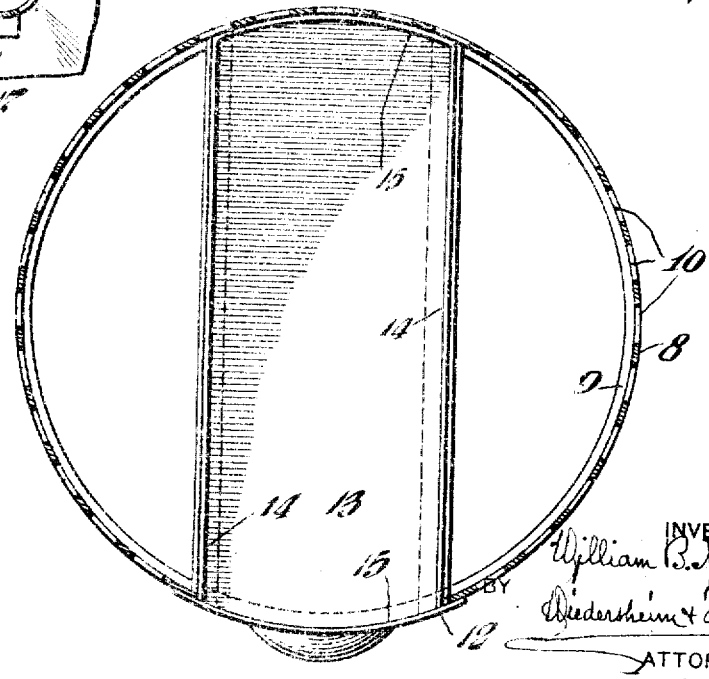

Patented Dec. 25, 1923.

1,478,879

UNITED STATES PATENT OFFICE.

WILLIAM B. NICHOLS, OF HADDON HEIGHTS, NEW JERSEY, ASSIGNOR OF ONE-HALF TO THOMAS E. BENSON, OF AUDUBON, NEW JERSEY.

SECTIONAL DEHYDRATOR.

Application filed August 4, 1922. Serial No. 579,753.

*To all whom it may concern:*

Be it known that I, WILLIAM B. NICHOLS, a citizen of the United States, residing at Haddon Heights, in the county of Camden, State of New Jersey, have invented a new and useful Sectional Dehydrator, of which the following is a specification.

My invention consists of a novel construction of a sectional dehydrator, whereby I am enabled to utilize a system of centralized distribution of moist heat into and through a series of sectional units, whereby I am enabled to extract water from food, such as fresh vegetables, fruits and the like all the year round, thereby enormously reducing the food bulk, retaining all the food values and perpetuating the food for future use, the storage space required for my novel device being greatly reduced and the food being capable of being restored to its original condition at any time by simply soaking it in water.

My invention, which can be made of any rustless material, such as aluminum, copper, galvanized metal and the like, differs from prior devices in that it comprises a base and a top member intermediately of which if desired are positioned the various units, which are adapted to be superimposed upon each other, so that the number of said units can be increased or diminished at will, whereby the capacity of the dehydrator is varied at will, and after the dehydration operation is completed, all the sections which have been used may be readily cleaned, since each unit is made without corners and easily taken apart so that the wire mesh trays carried by the various sections can be readily cleaned, so that my novel device can be kept in all times in a perfect sanitary condition.

My invention further consists of a novel construction of a base or first section, having provision therein for preventing the burning or scorching of any of the foods in any of the sections, particularly the first or bottom section, which is provided with a compartment packed with heat resisting or non-conducting material, which insures that the bottom trays should not receive a degree of heat higher than that transmitted through the central heat distributing chamber to the upper or superimposed trays.

My invention further consists in a novel manner of constructing the outer and inner portions of the sectional units, whereby each unit is adapted to be readily superimposed upon the next contiguous unit, and provision is made for an effective circulation of the heat or dehydrating medium to every portion of the dehydrator.

It further consists in the provision of novel means for enabling each sectional unit to accommodate or support a plurality of wire mesh trays, which may be used singly or together as the quantity of food being dehydrated demands, said trays being like the rest of the unit easily removed and kept in a perfect sanitary condition.

It further consists of novel means for controlling the main exhaust of the dehydrating medium, provision being made by ports in the outer walls for enabling said ports to carry off the odor and vapor from each particular unit, thus preventing an intermingling of flavors and odors imparted from an assortment of foods which may be in the process of dehydration at the same time.

It further consists in the application to the outer wall of each unit section of a dial or indicator which may be set to indicate the duration of time required for the dehydration of the food in that particular unit section.

It further consists of other novel features of construction and advantage, all as will be hereinafter fully set forth.

For the purpose of illustrating my invention, I have shown in the accompanying drawings one form thereof which is at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Figure 3 represents a section on the line

Figure 1:
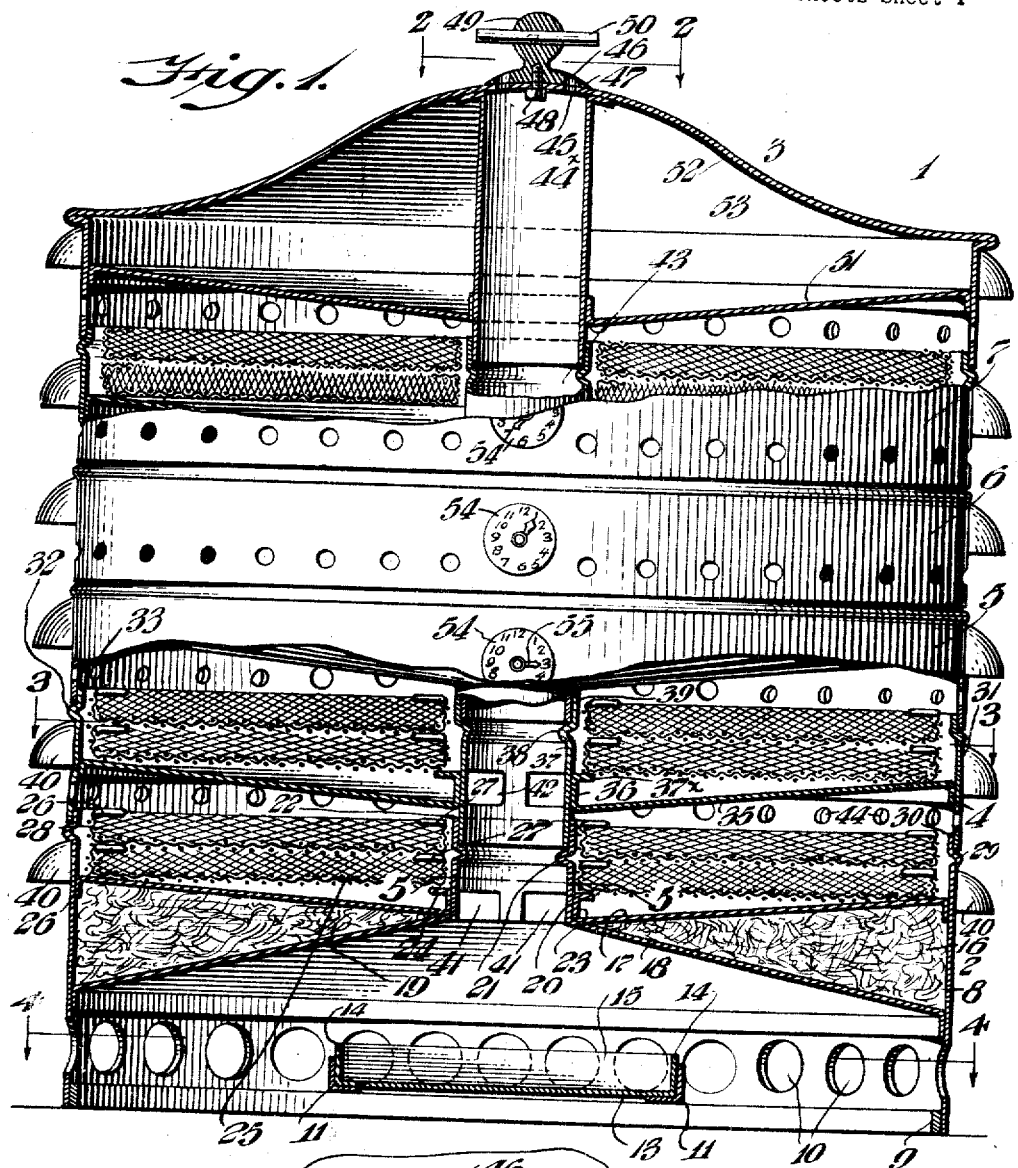
Figure 1 represents a vertical sectional view of a dehydrator embodying my invention, certain of the parts being shown in elevation.

3—3 Figure 1, showing one of the wire mesh screens and its adjuncts, and the manner of supporting a superimposed screen upon the screen below it.

Figure 4 represents a section on line 4—4 Figure 1.

Figure 5 represents a section on line 5—5 Figure 1.

Similar numerals of reference indicate corresponding parts.

Referring to the drawings:—

In the manufacture of my novel sectional dehydrator 1, I employ one standard base member 2, and a standard top member 3, which represent one complete unit, and in practice I assemble intermediately of said top and base the intermediate units or sections, as 4, 5, 6 and 7, all of the same construction, four of such units being shown in Fig. 1 and it being evident that their number may be increased or diminished, according to requirements.

The base 2 is composed of the annular shell 8, which is reinforced at its bottom edge by the inner ring 9, above which is the row of ports 10. 11 designates parallel ways which extend transversely of the base and may consist of angular strips, as seen in Fig. 1, which are supported upon the top of the ring 10, said ways supporting the pan 12, which is adapted for the reception of water, and consists of the bottom 13, the sides 14 and the ends 15. Heat is applied to or introduced into the base 2, from any suitable source, as electricity, gas, oil or an ordinary coal stove, and the regulation of the initial supply of heat may be effected by any suitable conventional means.

In order to prevent the burning or scorching of food in any of the sections, particularly the first, I provide the chamber 16, which is located between the top and bottom walls 17 and 18, and contains any suitable heat resisting or non-conducting material as 19. The bottom deflector wall 18 inclines upwardly and inwardly and terminates in the tubular extension 20, having the internal bead 21, above which is the tubular extension 22. The top wall or baffle 17 inclines downwardly and inwardly and terminates in the upwardly extending tubular member 23, which has the portions or tongues 24 deflected laterally, as seen in Figs. 1 and 5, said tubular member 23 surrounding the tubular extension 20.

Upon the tongues or laterally deflected flanges 24 is supported the lower tray 25, which is provided with the bottom wall and annular outer and inner vertical rims, upon which are secured the laterally extending outer and inner tongues 26 and 27. These are each preferably four in number, as will be understood from Figure 3, and upon these tongues 26 and 27 are supported an upper tray 28 made of wire mesh and having an annular outer and inner upright wall, which is also provided with the outer loops or tongues 26 and 27 of the character already described. It will be noticed that the tongues 26 are inturned horizontally from the outer peripheral rims of the trays, and the tongues 27 are inturned horizontally from the inner peripheral rims of said trays and so form broad supports for the trays one on the other. The upper portion of the outer wall 8 of the base section is provided with an annular bead 29, from which extends an upward annular extension 30, upon which is superimposed one of the dehydrator sections or units 4, the same comprising an outer wall 31 having the outer bead 32 and the upward extension 33. The section 4 has a bottom wall 35, which inclines downwardly and inwardly, and is provided with the upward tubular portion 36 having the lateral tongues or flanges 37$^x$, said tubular portion 36 engaging the inner tubular portion 37, which is provided with an internal bead 38, above which is the tubular extension 39.

The tongues or flanges 37$^x$ serve as supports for superimposed wire screens, whose construction has already been described.

The base member or section 2 is provided with the handles 40, as is also the upper sections 4, 5, 6 and 7. It will be understood that the base section 2 is provided with ports 41, whereby the heating medium is permitted to be discharged laterally into the space between the wall or baffle 17 and the superimposed wire screens, while the tubular member 37 is provided with similar ports 42, which permit the heating medium to discharge upon the space between the bottom wall 35 of the section 4 and the superimposed wire screens above said wall.

It will be understood from Figure 1 that when the various dehydrator sections are assembled, a central annular flue 43 is formed, wherein the dehydrating medium ascends upwardly, a portion of said heating medium discharging laterally through the ports as 41 and 42, and the exhaust being permitted to the exterior through the ports 44 in the side walls of each section 4, 5, 6 and 7. The upper portion of the flue 43 formed by the assembly of the sections discharges into the central flue 44$^x$ of the top section 3, which is provided at its upper portion with the ports 45, which communicate with the ports 46 and the rotary damper 47, the latter being rotatably mounted on the stem 48 and having the knob or finger piece 49 with a pin 50 passing therethrough, whereby the damper 47 can be readily rotated.

Figure 2:
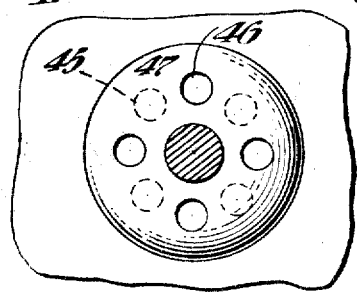
Figure 2 represents a section on line 2—2 Figure 1.

It will be apparent that when the ports 45 and 46 are out of alignment, as indicated in Figure 2, the upward progress of the dehydrated medium will be retarded, and when said ports are in alignment, a free exit is afforded to the dehydrating medium through said aligning ports 45 and 46.

The top section 3, as will be understood from Figure 1, is composed of a base member 51 and a top 52 having the chamber 53 formed therebetween. On the outer wall of each of the sections 4 to 7, I locate a dial 54 provided with numerals as 1 to 12, each dial carrying a pointer 55, whereby I am enabled to set the pointer opposite the desired numeral and thus to visually indicate the proper period for the duration of the dehydrating operation for the particular fruits or vegetables treated.

The operation is as follows:—

It will be apparent from Figure 1 that the base section 2 and the top section 3 form a complete unit, since the base section is enabled to accommodate a plurality of the fruit or vegetable supporting trays already referred to.

When it is desired to increase the capacity of the dehydrator, it is only necessary to remove the top section from the base section and to place in position one or more of the intermediate sections, so that it will be seen that a flexible sectional dehydrator is produced which can be marketed at a price where it is made possible for the individual housekeeper to enjoy the benefit of having fresh vegetables, fruits and the like all the year round, with the advantage of procuring them when the prices are lowest and perpetuating them in my novel device for use and enjoyment when the cost of such articles of food is high.

The various sections having been assembled in the manner indicated in Figure 1, it will be apparent that the vaporized air is supplied in such a quantity and at such a given temperature from any desired source of supply, that it will be in accordance with the volume and nature of the foods placed in the apparatus.

The dry air admitted through the circulating tubes 11 in the base section of the dehydrator passes over the evaporating pan 12, where it becomes vaporized and is deflected by means of the bottom deflected wall 18 into the vicinity of the central flue in which the dehydrating medium ascends, and thence passes into each unit section through the articles of food, where it is retained long enough to carry out the desired function, the exit of the dehydrated medium being made through the peripheral ports in the outer walls of each unit section. The inner annular wall of each individual unit section functions as a canal around the axis of the dehydrator, which when joined with the contiguous section forms a central radial heat distributing chamber or flue, which permits the vaporized air to radiate into the various sections with an equal intensity, thus assuring an even distribution of aqueous heat units over the entire area of the food trays in each section.

By the employment of the sectional units of the character described, it will be apparent that not only can the capacity of the dehydrator be varied at will by the housekeeper or user, but after the operator is through dehydrating, the number of sections which have been used may be cleaned without any material effort, due to the fact that the various sections or units are annular, have no corners and can be easily taken apart, which is an important item not present in a dehydrator constructed as a single unit rigid apparatus.

In each unit section, I have made provision for the combination of two wire mesh trays, which may be used singly or in unison as the quantity of food being dehydrated demands, these trays being easily removed like the rest of the unit and thus being capable of being kept in a perfect sanitary condition.

By the novel construction of the base or first section, means is provided for preventing the burning or scorching of food in any of the sections, particularly the first, since the compartment packed with the heat resisting or non-conducting material causes the bottom tray to not exceed a degree of heat higher than that transmitted through the central heat chamber to the upper superimposed parts. This degree of heat may of course be regulated to the desired extent by the heating appliance used, whether it be electricity, gas, oil or an ordinary coal stove, and, in addition, there is provided the heat regulator or rotary damper 47, whose function has already been explained, this heat regulator being only required where the nature of the heat appliance is such as to prevent its proper regulation.

It will further be apparent that I have made provision for readily taking the temperature of any individual unit section by the simple operation of inserting the mercury bulb of the ordinary thermometer into any of the peripheral holes in the outer wall of the dehydrator sections, it being apparent that by my novel construction, the temperature of any one or every unit may be obtained, thereby obviating the necessity of opening any part of the dehydrator with its subsequent loss of heat.

It will further be apparent that by my novel sectional construction, the openings in the outer walls of each unit or section act as exhaust ports which permit the egress of the odor and vapor in that particular unit, thus preventing an intermingling of flavors and odors imparted from an assortment of foods which may be in the process of dehydration at the same time.

The dial or indicator 54 may be set to indicate the duration of time required for the dehydration of the food in each particular unit section.

It will be seen from the foregoing that by my invention, the mechanical act of evaporating through exosmosis practically all the water and moisture from food by the process of softening the tough fibres with vaporized air without breaking up the cellular coats of starch and without bursting the granules or cell walls of the food, can be effectively carried out by my device. The foregoing operation is accomplished without dry heating but with sufficient moist heat to destroy all parasites and disease germs, removing practically all water and carrying the foods to a state of semi-solidification. A final treatment of dry heat hermetically seals up all the various outer tissue cells of the food stuffs, which makes it possible to keep food from decomposing or disintegrating for practically an indefinite period.

Dehydration carried out as in my invention reduces the food bulk from many times its original size and weight and makes it possible for the same food to regain its original condition by simply submerging it in water for a time.

The foods thus dehydrated differ from those put through the drying process inasmuch as the flavors, colors and vitamines are practically retained as when in their original condition, whereas the drying of foods is a process which invariably bursts the cellular coats of starch and the granules of grain and cells of other foods, volatizing their odors and flavors and emptying the cells of the vitamine contents, changing the color and rendering less nourishing and less staple, foods treated otherwise than by dehydration.

It will consequently be apparent from the foregoing that dehydration particularly as carried out by my novel apparatus possesses advantages over the less economic methods of cold-pack and preserving with sugar, since,—

First:—No additional material, as bottles, sugar, or jar tops, is required, and there is no breakage or food loss through fermentation.

Second:—There is a great saving in labor effected by the reduction in time required in preparing bottles, sterilizing containers and in the blanching of most foods.

Third:—The heat required in dehydration is reduced to a point where it is almost negligible in cost, and the low degree of confined heat eliminates the objectionable feature of having the house unbearably heated with steam and its consequent damage to wall surfaces, such as occurs in coldpack, steam or preserving processes.

Fourth:—An additional advantage in dehydration by my novel apparatus occurs out of the simplicity of the process, since no danger or personal injury to the operator, such as scalding, burning or the like is present, and only a very small storage space is required for the dehydrated products. For example, rhubarb and asparagus reduce themselves to about one-tenth of their original bulk, and the only container necessary for these dehydrated foods is the commonly used paper bag.

It will further be apparent in the manufacture of my device that the base and top sections 2 and 3 are of standard construction, and that all the intermediate units or sections, as 4, 5, 6 and 7, are also of one standard construction, so that the apparatus in its entirety can be very cheaply constructed and readily assembled by any housekeeper or servant.

While I have shown the preferred manner of assembling the base section and the superimposed sections and top sections, it will be apparent that slight changes may be made in the manner of constructing and assembling these sections, if desired.

It will be apparent from Figure 1 that the outer bead 29 and the inner bead 21 of the lower or base section serve as abutments to arrest or limit the downward movement of the superimposed section or unit 4, and that the corresponding beads of the upper superimposed sections or elements have the same function, so that when all the sections are assembled, they are readily centered and guided during the act of assembling or superimposing the sections or units upon each other.

It will, however, be apparent that other equivalent constructions which will facilitate the centering and removal of the sections or units may be employed, without departing from the spirit of my invention.

It will further be apparent from Figure 1 that the lower wall 18 of the base section 2 serves as a deflector plate to converge or direct the dehydrating medium into the central flue, and that the upper wall 17 serves as a baffle plate to direct the dehydrating medium from the central flue, and that the upper wall 17 serves as a baffle plate properly to direct the portions of the dehydrating medium which have their exit through the ports 41 in the desired direction upwardly through the trays 25 and 28.

It will of course be understood that while I have shown a plurality of the trays 25 and 28 employed in the various sections, that only a single tray may be employed, if desired. The lower one of the trays, as 25, is effectively supported in a horizontal position by its contact with the outer periphery of the baffle plate 17, and with the tongues, flanges or lugs 24, as is evident.

It will be apparent that a sectional dehydrator constructed in accordance with my invention can be effectively used for dehydrating fruits, vegetables and the like, is simple in operation, compact in form, has low manufacturing cost, high practical efficiency, is sanitary under all conditions and will be capable of thoroughly dehydrating a large quantity of fruits or vegetables in a short space of time.

Having thus described my invention, what I claim as new and desire to secure by Letters Patent, is:—

1. In a device of the character stated, a base section provided with a plurality of ports in the wall thereof, a water holding tray carried by said base section, a central flue for said base section, an upwardly inclined deflecting wall in the upper portion of said base section, a baffle plate wall above said first-named wall whereby a chamber is formed between said walls, and heat resisting material located in said chamber.

2. In a device of the character stated, a base section provided with a plurality of ports in the outer wall thereof, a central flue for said base section, an upwardly inclined deflecting wall in the upper portion of said base section, a baffle plate above said wall, whereby a chamber is formed between said walls, and a heat resisting material in said chamber, there being ports in said central flue for permitting the dehydrating medium to discharge upon said baffle plate.

3. In a device of the character stated, a base section provided with a plurality of ports in the outer wall thereof, a central flue for said base section, an upwardly inclined deflecting wall in the upper portion of said base section, a baffle plate above said wall, whereby a chamber is formed between said walls, and a heat resisting material in said chamber, there being ports in said central flue for permitting the dehydrating medium to discharge upon said baffle plate, in combination with a removable tray supported above said baffle plate.

4. In a device of the character stated, a base section provided with ports in the outer wall thereof, an annular ring reinforcing the inner lower edge of said wall, a water holding tray mounted on supports carried by said bottom annular ring, a bottom deflecting wall in the upper portion of said base section, an upper wall in said base section forming a baffle plate, thereby forming a chamber between said walls, a packing of non-conducting material in said chamber, a central vertical flue for said base section, an internal bead in said flue, and an external horizontally aligning bead on said outer wall for effecting the positioning of an upper dehydrating section or unit.

5. In a dehydrator, a detachable intermediate section or unit, comprising an outer wall having an annular bead thereon, a lower wall forming a base of said unit and having its inner portion secured to an open-ended tube, said tube having ports therein discharging upon the upper surface of said bottom wall, and laterally deflected tongues on the inner portion of said unit for supporting a detachable tray.

6. In a dehydrator, a base section provided with a central upwardly extending flue and an outer annular wall, an inwardly projecting bead in said central flue, an outwardly projecting bead on said outer wall in horizontal alignment, and a superimposed detachable section or unit having its lower edges supported upon said beads, and a top section provided with a central vertical flue aligning with the central flue of said base section and intermediate section.

7. In a dehydrator, a base section provided with a central upwardly extending flue and an outer annular wall, an inwardly projecting bead in said central flue, an outwardly projecting bead on said outer wall in horizontal alignment, a superimposed detachable section or unit having its lower edges supported upon said beads, and a top section provided with a central vertical flue aligning with the central flue of said base section and intermediate section, in combination with ports in the top of said central upper flue, and a draft regulator for controlling the exit of the dehydrating medium through said ports.

8. In a device of the character stated, a base section provided with ports in the lower portion thereof, a water holding tray supported in said base section and extending transversely thereof, an upper deflector wall for said base section and a baffle plate above said base section, a central flue for said base section having ports discharging above said baffle plate, a plurality of detachable sections or units superimposed above said base section and upon each other, said units being provided with a central flue aligning with the flue of the base section and having ports in the side walls thereof, and also ports in said central flue for discharging the dehydrating medium upon the material to be treated, and a top section also provided with a central flue aligning with the flues of the base section and the intermediate units.

9. In a device of the character stated, a base section provided with ports in the lower portion thereof, a water holding tray supported in said base section and extending transversely thereof, an upper deflector wall for said base section and a baffle plate above said base section, a central flue for said base section having ports discharging above said baffle plate, a plurality of detachable sections or units superimposed above said base section and upon each other, said units being provided with a central flue aligning with the flue of the base section and having ports in the side walls thereof and also ports in said central flue for discharging the dehydrating medium upon the material to be treated, and a top section also provided with a central flue aligning with the flues of the base section and the intermediate units, in combination with ports in the top wall of said upper flue, and a rotatable draft regulator controlling the exit of the dehydrating medium through said ports.

10. A detachable section for a dehydrator composed of an outer annular wall, an inner flue, a bottom wall, and ports in said inner flue discharging upon said bottom wall, and ports in said outer wall for permitting the escape of the dehydrating medium, a dial on said outer wall, and a pointer for said dial.

11. In a device of the character stated, a detachable dehydrator unit provided with a bottom wall, an outer annular wall and a central annular flue, the latter having ports therein discharging above said bottom wall, inner laterally deflected tongues for supporting the inner edges of an annular tray and a plurality of outer and inner laterally projecting supports carried by said tray for supporting a superimposed tray.

WILLIAM B. NICHOLS.

Witnesses:
 THOS. E. BENSON,
 C. D. McVAY.